United States Patent
Chen et al.

(10) Patent No.: US 12,282,802 B2
(45) Date of Patent: Apr. 22, 2025

(54) SYSTEMS, DEVICES, AND METHODS TO SUPPORT TEAMWORK IN COLLABORATIVE GEOGRAPHIC SIMULATION EXPERIMENTS

(71) Applicant: Nanjing Normal University, Nanjing (CN)

(72) Inventors: Min Chen, Nanjing (CN); Zaiyang Ma, Nanjing (CN); Songshan Yue, Nanjing (CN); Teng Zhong, Nanjing (CN); Guonian Lv, Nanjing (CN); Yongning Wen, Nanjing (CN)

(73) Assignee: NANJING NORMAL UNIVERSITY, Nanjing (CN)

( * ) Notice: Subject to any disclaimer, the term of this patent is extended or adjusted under 35 U.S.C. 154(b) by 446 days.

(21) Appl. No.: 17/937,039

(22) Filed: Sep. 30, 2022

(65) Prior Publication Data

US 2024/0111576 A1     Apr. 4, 2024

(51) Int. Cl.
  *G06F 3/00*   (2006.01)
  *G06F 9/38*   (2018.01)
  *G06F 9/48*   (2006.01)

(52) U.S. Cl.
  CPC .......... *G06F 9/4881* (2013.01); *G06F 9/3838* (2013.01)

(58) Field of Classification Search
  CPC ....................................................... G06F 9/48
  See application file for complete search history.

(56) References Cited

U.S. PATENT DOCUMENTS

| | | | |
|---|---|---|---|
| 5,874,955 A * | 2/1999 | Rogowitz | G06N 5/022 345/589 |
| 6,256,581 B1 * | 7/2001 | Fujii | G01C 21/3629 701/428 |
| 7,668,821 B1 | 2/2010 | Donsbach et al. | |
| 7,885,844 B1 * | 2/2011 | Cohen | G06Q 10/10 |
| 8,943,070 B2 | 1/2015 | Jin et al. | |
| 9,449,355 B2 | 9/2016 | Kozicki et al. | |
| 10,592,275 B2 | 3/2020 | Iniguez | |
| 10,704,912 B2 * | 7/2020 | Kim | H04W 4/024 |
| 10,740,778 B1 * | 8/2020 | Nair | G06Q 30/0222 |

(Continued)

OTHER PUBLICATIONS

Hao Wang, Location Recommendation in Location-based Social Networks using User Check-in Data. (Year: 2013).*

(Continued)

*Primary Examiner* — Lechi Truong
(74) *Attorney, Agent, or Firm* — SALIWANCHIK, LLOYD & EISENSCHENK

(57) ABSTRACT

The subject pertains to systems, methods, and devices to provide improved teamwork guidelines for collaborators in geographic simulation experiments, whereby the collaborators can be led to participate in the geographic simulation tasks according to the teamwork guideline and be instructed to implement the simulation tasks to achieve their goals. The invention can automatically recommend appropriate geographic simulation schemes for specific geographic problems and communicate simulation task information and dependencies. Novel guide cards can instruct teamwork in geographic simulation experiments. Thus, the cards can advantageously instruct, promote, or guide teamwork in geographic simulation experiments and enhance the efficiency of geographic problem-solving.

15 Claims, 7 Drawing Sheets

(56) References Cited

U.S. PATENT DOCUMENTS

| | | | | |
|---|---|---|---|---|
| 10,747,651 | B1* | 8/2020 | Vanderwall | G06F 11/3684 |
| 11,222,299 | B1* | 1/2022 | Baalke | G01C 21/3691 |
| 2004/0015783 | A1* | 1/2004 | Lennon | G06F 16/258 |
| | | | | 715/255 |
| 2004/0068352 | A1* | 4/2004 | Anderson | G05D 1/0219 |
| | | | | 701/25 |
| 2013/0046704 | A1* | 2/2013 | Patwa | G06Q 10/06 |
| | | | | 705/321 |
| 2014/0195290 | A1 | 7/2014 | Plost et al. | |
| 2020/0258508 | A1* | 8/2020 | Aggarwal | G10L 15/1822 |
| 2020/0364662 | A1* | 11/2020 | Avery, Jr. | G06F 3/0486 |
| 2020/0389495 | A1* | 12/2020 | Crabtree | G06F 16/9024 |
| 2021/0199458 | A1* | 7/2021 | Aggarwal | G01C 21/3626 |
| 2022/0222047 | A1* | 7/2022 | Todirel | G06F 8/33 |
| 2023/0126063 | A1* | 4/2023 | Sun | G06Q 30/0633 |
| | | | | 705/27.2 |
| 2023/0353973 | A1* | 11/2023 | Fersman | H04W 4/023 |

OTHER PUBLICATIONS

Andrienko, N. and Andrienko, G. "Intelligent support for geographic data analysis and decision making in the Web" Journal of Geographic Information and Decision Analysis, 2001, 5(2):115-128.

Cai, Y. et al. "Personalized resource search by tag-based user profile and resource profile" International Conference on Web Information Systems Engineering (WISE), Conference Paper in Lecture Notes in Computer Science (LNCS 6488), Dec. 2010, pp. 510-523.

\* cited by examiner

SYSTEMS, DEVICES, AND METHODS TO SUPPORT TEAMWORK IN COLLABORATIVE GEOGRAPHIC SIMULATION EXPERIMENTS

BACKGROUND OF THE INVENTION

Geographic problems, such as air pollution, urban flood, soil degradation and forest fire, are very common in human life and closely related to geographic environments and factors. As geographic simulation can be used to explore various phenomena and processes in geographic environments and discover the laws and mechanisms behind these phenomena and processes, it is a significant method for solving geographic problems. In addition, being different from other geographic problem-solving methods (e.g., geographic modeling and geographic information processing), geographic simulation can use geographic information and models to express, reproduce and predict geographic phenomena and processes. While geographic modeling is the process of abstracting the geographic environment to express geographic environments into equations and rules; geographic information processing is usually the process of visualization and normalization of geospatial data to make these data easier to understand and use. A geographic simulation experiment consists of tasks in which the users perform actions. Such actions can include explaining the geographic elements, understanding geographic problems, constructing geographic models, simulating the geographic process by using models, conducting visualization analysis of simulation results. Because of the differences of geographic problems, the task types and logical relations are also different. As geographic problems are complex, a collaboration of people from different fields and backgrounds can be helpful in these experiments for understanding the geographic problem and providing solutions.

For the solution of complex geographic problems involving different domains, the collaborative problem-solving technique has traditionally been paid more attention, developing along three major perspectives: geographic modeling, geographic simulation, and geographic information processing. These three perspectives possess similar tasks but there are some differences also. Geographic modeling is the process of abstracting the geographic environment to express geographic environments into equations and rules. Geographic information processing is the process to visualize and normalize geospatial data. This process makes these data easier to understand and use. Geographic simulation uses geographic information and geographic models to express, reproduce and predict geographic phenomena and processes. Geographic simulation is a crucial method that could explain geographic phenomena and predict processes to explore human-land relationships. Currently, a large variety of collaborative environments, tools, and strategies are being proposed. Compared to the other two perspectives, geographic simulation faces some limitations in the collaborative mode as well. The collaborative tools and process that are already present to carry out geographic modeling and information processing are not capable of applying directly in collaborative geographic simulation.

Geographic simulation, geographic modeling, and geographic information processing are three important methods for solving geographic problems. Experts and researchers have investigated these methods and have designed various collaborative environments, tools, and strategies to support the collaborative solving of geographic problems. For carrying out a collaborative geographic problem-solving effort, a collaborative environment can be provided for the participants to analyze and solve the problems in a group. So, a series of systems, platforms or frameworks that can support collaboration have been created. For example, PPGIS/PGIS, Optiputer and Collaborative GIS facilitates with collaborative environments for geographic information processing; Hydro share and other web-based modeling platforms can support collaborative modeling; Collaborative Virtual Geographic Environment (CVGE) can help collaborative geographic simulation. Moreover, in a collaborative environment, collaborative tools and processes help the collaborators to understand the geographic environments and then solve the problems. Hence, researchers have designed and developed relevant tools that can support collaborative problem analysis and geographic modeling, such as communication tools, problem analysis tools, and result evaluation tools. To improve the effect and quality of collaborative geographic problem solving, researchers have also proposed different collaborative strategies and methods to serve collaborative geographic information processing and geographic modeling. Furthermore, to organize and coordinate different people to effectively participate in geographic problem solving, researchers have focused on geographic information processing, geographic modeling, and other processes to sort out the steps and related tasks of geographic problem-solving. Current research efforts focused on strategies and methods for supporting collaborative geographic simulation are still insufficient to meet the demands of the collaborative environment. The existing achievements could effectively support collaborative geographic problem solving, while the problem of how to instruct participants to conduct geographic simulation experiments has not been well solved. The cognition of geographic simulation process and related tasks is still not clear.

BRIEF SUMMARY OF THE INVENTION

To increase the efficiency of collaboration, there exists a need for improved teamwork guidelines for collaborators in geographic simulation experiments, whereby the collaborators can be led to participate in the geographic simulation tasks according to the teamwork guideline and be instructed to implement the simulation tasks to achieve their goals.

Embodiments of the subject invention can provide systems, devices, or process whereby: (1) users input the features of geographic problems, and based on these features, a system, device, or process of the subject invention automatically recommends suitable collaborative simulation schemes that can describe the simulation task types and simulation pathways from a geographic simulation scheme library; (2) the detailed information of each simulation task that describes the specific implementation steps of the task can be searched from the geographic simulation task pool and bound to the selected scheme; (3) by using the card making equipment, the information of geographic simulation tasks can be written on the card to create guide cards for teamwork that can show the experimental process of the geographic simulation and implementation steps of the simulation tasks. Embodiments allow the participation of people from different fields and help them to better understand the tasks and processes. Therefore, collaborative methods of the subject invention can be advantageous for the solution of geographic problems. Embodiments provide a subsystem for making guide cards that better support teamwork in geographic simulation experiments. The subsystem and related systems and methods advantageously support different team members to carry out geographic simulation experiments orderly and efficiently in a collaborative way.

Certain embodiments of the subject invention provide a novel guide card making subsystem and related systems and methods to produce guide cards that can instruct teamwork in geographic simulation experiments. Embodiments can automatically recommend appropriate collaborative geographic simulation schemes for specific geographic problems, and define, mark, or otherwise communicate simulation task information and dependencies (e.g., through the cards.) Thus, the cards can advantageously instruct, promote, or guide teamwork in geographic simulation experiments and enhance the efficiency of geographic problem solving.

Traditional collaboration modes in geographic simulation can ignore the expression of the pathway, thus causing difficulties in orderly conducting collaborative simulations. Geographic simulation for complex geographic problems is difficult to complete directly, in part because it is not a simple linear process. In geographic simulation experiments, simulators often need to perform various simulation tasks, which can have one or more interdependencies, and the output of a certain simulation task is often the input for the next task. In traditional geographic simulation experiments, due in part to the neglect of the expression of geographic simulation pathway, collaborative simulation is difficult to be orderly carried out. Inefficiencies including task waiting, constant attempts, and repeated iterations often occur during the simulation process. Embodiments of the subject invention can clarify the logical dependency information (e.g., predecessor, successor, inputs, outputs, and related tasks) of different simulation tasks and coordinate such tasks. Further embodiments of the subject invention can help different collaborators understand the implementation steps and logical dependencies of geographic simulation tasks to facilitate teamwork and collaboration in geographic simulation experiments. Through the understanding of the successor and predecessor tasks, the guidance of collaborators can be advantageously improved.

In embodiments of the subject invention, the logical dependency information can identify certain relationships between tasks. One embodiment of logical dependency information can consist of five content areas: (1) a list of related tasks, (2) a list of predecessor tasks, (3) a list of successor tasks, (4) a set of inputs of the current task, and (5) a set of outputs of the current task. In certain embodiments, the list of related tasks can introduce the information (e.g., task ID, task name, and task purpose) of each task that has logical relationships with the current task. The list of predecessor tasks and the list of successor tasks can contain the task IDs of all prerequisites tasks and all next tasks. Specific detailed task information can be found in the list of related tasks. The inputs and outputs of the current task can define the input resources from the predecessor and output resources to the successor tasks according to the semantics and formats.

The difficulty of geographic simulation can restrict the implementation of teamwork, and collaborators need a guideline that can assist the implementation of geographic simulation tasks. Faced with the complex tasks in geographic simulation experiments, participants from different fields sometimes need to engage in tasks outside their areas of expertise. Due to the difficulty of geographic simulation, such participants can be challenged, inefficient, or unable to deal with various technical, collaborative, or professional issues during geographic simulation processes. This can lead to decreases in accuracy and effectiveness of geographic problem solving. To improve collaborative geographic simulation experiments, the embodiments of the subject invention can provide or recommend certain implementation methods (or steps) of geographic simulation tasks for simulators. The difficulty of simulation experiments can be reduced or overcome by thus instructing the simulation participants. Embodiments can thus provide, support, or enhance effective collaborative geographic simulation.

Embodiments of the subject invention provide a guide card making subsystem that can support teamwork in geographic simulation experiments. The subsystem and related systems and methods can perform the automatic recommendation of geographic simulation schemes and task implementation methods, bind methods to tasks, and mark the dependencies and implementation methods of simulation tasks on the cards. With the use of guide cards in accordance with the subject invention, the difficulty of geographic simulation is lowered and collaborators can be enabled to carry out the experiments successfully.

Embodiments can identify different geographic problems as well as automatically match and recommend collaborative simulation schemes (e.g., from a library of geographic simulation schemes) based on certain identified features of geographic problems, including but not limited to: domain (e.g., water, soil, air, life, human society, etc.), purpose (e.g., risk assessment, meteorological prediction, disaster response, etc.), dimension (e.g., spatial dimension, time dimension, etc.), scale (e.g., global scale, regional scale, urban scale, annual scale, daily scale, etc.), region (e.g., forest, desert, lake, etc.), time (e.g., time point, time period, etc.), resource (e.g., data resources, model resources, computable resources, etc.) Embodiments can also help users to determine the pathways of geographic simulation experiments. According to the simulation scheme the corresponding implementation methods of the simulation tasks can be searched from the geographic simulation task pool. The collaborators in geographic simulation experiments can be aided by the teamwork guide cards including simulation experiment pathway and implementation steps.

The high-level framework for an embodiment of the subject invention is shown in FIG. 1, including: 1) Geographic simulation scheme matching subsystem; 2) Geographic simulation task binding subsystem; 3) Guide card making subsystem. Because geographic problems can be accompanied by different geographic processes, it can be beneficial to first identify the geo-problem-suitable simulation schemes. Through the Geographic simulation scheme matching subsystem, the dependencies of simulation tasks can be determined. Through the Geographic simulation task binding subsystem, the specific implementation methods can be bound to corresponding tasks in the simulation scheme. A physical guide card for collaborative geographic simulation can then be created from the Guide card making subsystem.

In an embodiment, the Geographic simulation scheme matching subsystem can include: 1) Input terminal connector; 2) Geo-problem recognition device, and 3) Geographic simulation scheme library. The Geographic simulation task binding subsystem can include a Geographic simulation task pool. The Guide card making subsystem can include the Card making device and the Card management center.

As illustrated in FIG. 2, one element of certain embodiments of the subject invention that can interact with users is the Geographic simulation scheme matching subsystem. The subsystem can obtain information (e.g., the feature information of geographic problems) that is input by the users (e.g., through the Input terminal connector.) The feature information can include, for example, the region and time where problems happened, the domains and geographic objects that problems involved, the purposes of problem solving, and the currently owned resources. The input features can be formalized as tags in the Geo-problem recognition device that then can implement a method of feature matching. After this matching process, the Geo-problem recognition device can suggest collaborative geographic simulation schemes (e.g., from the Geographic simulation scheme library.) In addition, the user can also use the input terminal to adjust the recommended simulation scheme.

As detailed in FIG. 4, the Geographic simulation task binding subsystem can receive the determined or selected geographic simulation scheme, discretize and identify the tasks that can be contained in the geographic simulation scheme, and search implementation methods of tasks from the Geographic simulation task pool and bind them into the corresponding simulation tasks. After this, the simulation task can be packed into another task information unit. This task information unit records selected (e.g., some or all) logical dependencies between different steps taken during the implementation of selected tasks. The resulting information units can be used as input for the Guide card making subsystem. The task information unit can be central to the operation of certain embodiments and can be managed directly by the Card management center and also can be stored in the guide card itself. Embodiments can provide an advantageously improved structure for teamwork on geographic simulation for a geographic problem (e.g., by producing a set of guide cards based at least in part on task information units.)

In an embodiment, the task information unit can contain certain specified information of one or more tasks (including, e.g., task name, task ID, task purpose, logical dependencies, implementation steps, and related geographic scene) that can be used, for example, to make a guide card. The logical dependencies can describe, for example, a list of related tasks, a list of prerequisite tasks, a list of next tasks, a list of inputs of the current task, and a list of outputs of the current task. The implementation steps of the task can instruct participants to perform the task. The related geographic scene can be stored as an external link and can obtain one or more images or other media (e.g., sound, video, audio, 3D image, enhanced image, map, or illustration) files or representations related to geographical phenomena or features.

The guide card can record the geographic simulation task information (e.g., task name, required steps, relevant standards, and goals to be achieved), task ID, task implementation method, task dependency and other data. The collaborators can select the guide card of their choice (or the system can assign a guide card for them) to work on corresponding simulation tasks according to their proficiency, backgrounds and basic roles. The information on the card can instruct users to undertake different geographic simulation tasks individually or together. In addition, the user can also use the task ID to query the specific details of the geographic simulation scheme (including the complete geographic simulation pathway and related information) directly on the Physical guide card, on the Guide card making subsystem, or through a network.

Embodiments provide a novel method to support collaborative geographic simulation experiments. Traditional support methods for collaborative geographic simulation are often devoted to providing collaborative working environments and tools to help users jointly carry out simulation tasks. By contrast, embodiments of the subject invention can be proposed from the perspective of guiding participants and focused on optimizing simulation task dependencies and implementation steps. Embodiments can recommend a geographic simulation scheme according parameters of a given situation and also can provide the steps to undertake for specific geographic simulation tasks.

Embodiments of the subject invention provide a flexible suggestion of geographic simulation scheme (e.g., including the pathway of geographic simulation experiments and the metadata of the geographic simulation scheme.) In traditional systems, many problems (e.g., waiting for task, constant and repeated attempts, etc.) can be faced due to negligence in the expression of geographic simulation scheme and relationships between simulation experiments, even though collaborative environments can be reliable to carry out simulation experiments individually. By contrast, embodiments of the subject invention can flexibly recommend simulation schemes that effectively instruct and guide collaborators to carry out specific simulation task in an appropriate manner and at an appropriate time.

Embodiments can provide the steps to undertake a geographic simulation task. For the cross-domain collaboration scenario, the subject invention, in order to reduce the difficulty of geographic simulation, can search specific implementation methods of geographic simulation tasks from the Geographic simulation task pool to better instruct the collaborators. The steps to undertake in the implementation process (along with related, helpful, or supporting information) can be displayed (e.g., on the card) to help the collaborators in performing and applying these steps in the simulation of geographic processes.

DETAILED DISCLOSURE OF THE INVENTION

Figure 1:
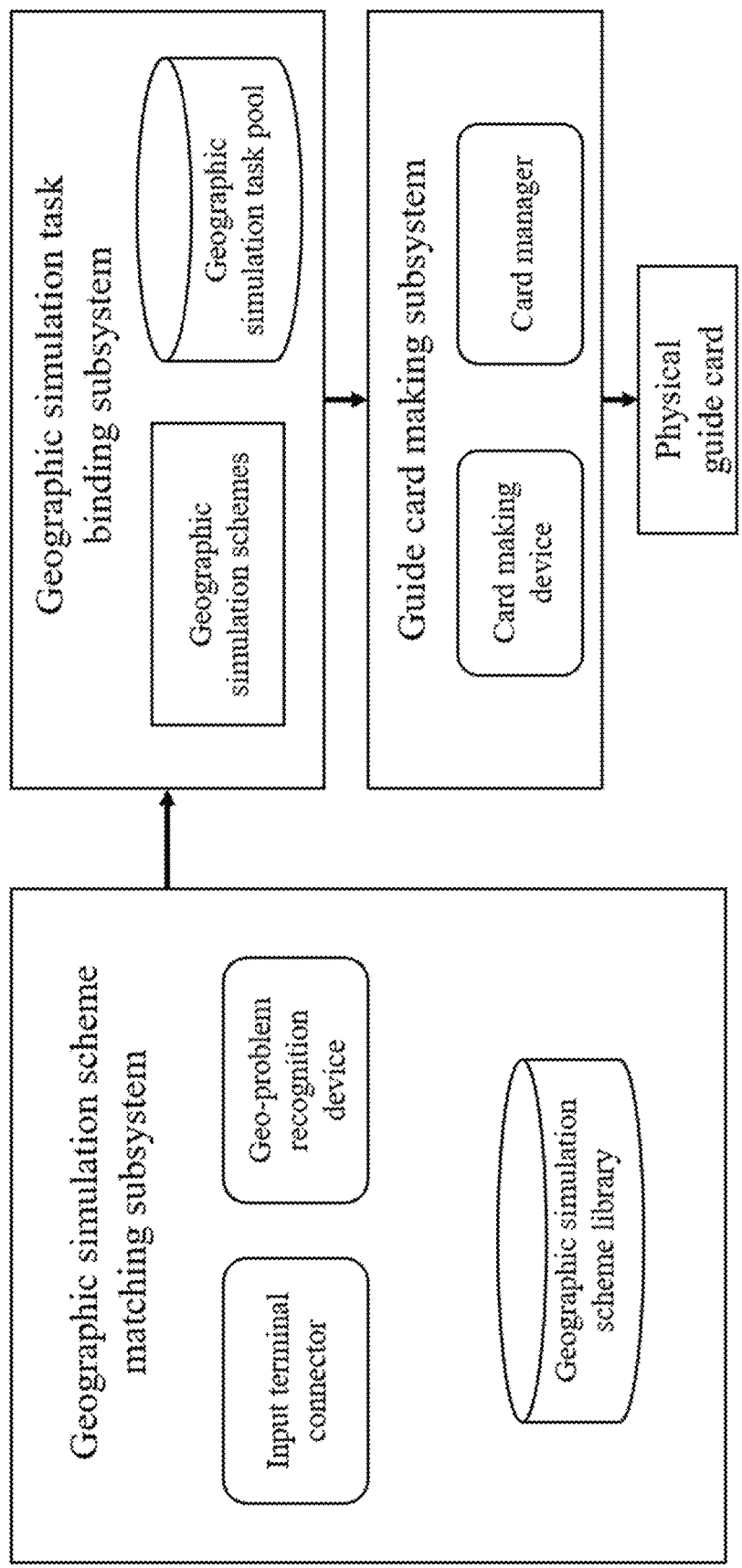
FIG. 1 illustrates an overall framework connecting high level elements in accordance with an embodiment of the subject invention.

A high level framework for an embodiment of the subject invention is shown in FIG. 1, including: 1) Geographic simulation scheme matching subsystem; 2) Geographic simulation task binding subsystem; 3) Guide card making subsystem. Because geographic problems can be accompanied by different geographic processes, it is important to determine the geo-problem-suitable simulation schemes initially. With the provided Geographic simulation scheme matching subsystem, the dependencies of simulation tasks can be determined. Through the provided Geographic simulation task binding subsystem, the specific implementation methods can be bound to corresponding tasks in the simulation scheme. Using a simulation scheme, a physical guide card for collaborative geographic simulation can be created from the Guide card making subsystem.

In an embodiment, the Geographic simulation scheme matching subsystem can provide: 1) Input terminal connector; 2) Geo-problem recognition device, and 3) Geographic simulation scheme library. The Geographic simulation task binding subsystem can include Geographic simulation schemes and a Geographic simulation task pool. The Guide card making subsystem can provide a Card making device and a Card management center.

The Geographic simulation scheme matching subsystem can use the feature information of geographic problems to determine and output appropriate geographic simulation schemes. The feature information of geographic problems can be received through the Input terminal connector and formalized as tags in the Geo-problem recognition device. Utilizing these tags, the process of finding out an appropriate scheme from the Geographic simulation scheme library by matching the features (e.g., as represented by one or more tags) with different schemes can be carried out.

In certain embodiments the Input terminal connector can be applied to connect with a user input subsystem comprising one or more input terminals (e.g., keyboard, mouse, voice receiving device, touch screen), and receive incoming information. The user input subsystem can also include user feedback devices (e.g., screen, indicator lights, alarms, printouts) for directing, confirming, or requesting user input. The user input subsystem can comprise a database, a file transfer system, a web portal, or other means of receiving, storing, or tracking data in text, natural language, structured data, or tagged formats. The user can describe the geographic problems around a number of (e.g., seven) key points, including for example: domain, purpose, dimension, scale, region, time, and resource. The user can enter the relevant information of geographic problems through one or more input terminals. The Input terminal connector can process the information from input terminals into descriptive textual information and transmit it to the Geo-problem recognition device, such that the output information of the Input terminal connector can include attributes (e.g., a set of seven attributes including: domain, purpose, dimension, scale, region, time, and resource) to describe the geographic problem.

The provided Geo-problem recognition device can process the descriptive information transmitted from the Input terminal connector to identify the basic features of the geographic problem (e.g., seven basic features.) In an embodiment, the core process of this device is to extract features from the problem description (e.g., a textual description in a sentence, paragraph, bulleted, or phrased narrative or factual form; a tagged description; or a structured data description) of a geographic problem and change the form of the features as needed (e.g., from natural language structure to tag-based structure; or from one tagged structure to another tagged structure.) Since the input information can contain, for example, seven types of attribute descriptions, the Geo-problem recognition device can apply a natural language processing method (or other analysis method as known in the art) to extract features of the geographic problem according to these attributes. For example, for the description of a forest harvest in some XX Forest Farm, the users can mention "prediction of harvest volume of Chinese fir plantation after twenty years". This is the description of purpose. The region is described as "XX Forest Farm is located in Pingxiang City, Province Jiangxi." For these descriptions, the device can select these features "prediction", "Volume", "Jiangxi" and "Pinxiang" to instruct the collaborators. These selected features can be tagged and these tags can be formalized according to the geographic problem, allowing the device to use the tags to match appropriate simulation schemes from the Geographic simulation scheme library.

Embodiments provide a tag-based structure comprising tags selected from the list including domain, purpose, dimension, scale, region, time, and resource. Alternative embodiments provide a tag-based structure consisting of (or consisting essentially of) one or more tags (e.g., 1, 2, 3, 4, 5, 6, or 7 tags) selected from the list including domain, purpose, dimension, scale, region, time, and resource. Further alternative embodiments can provide a structure not based on tags, or based on a different number or set of tags, combining tags with metadata, or based on a database structure or other organization method.

Embodiments provide one or more guide cards with a graphical representation of a task, printed data related to the task, and digital data related to the task. Digital data can be stored on a non-transitory machine-readable medium stored with the guide card, linked to the guide card, or accessible from the guide card. Printed data or digital data can include steps, methods, standards, requirements, training, background, successor, predecessor, input, output, or other information. Printed data can be printed directly on a card or card stock, applied as a tape, label, or sticker, or otherwise attached or displayed (e.g., electronically displayed on a tablet, tag, token or LED display as known in the art.) A graphical representation of a task can include an image of the task subject, geographic area, desired output, or other information related to the task and useful to identify, recognize, understand, complete, or execute the task. A graphical representation can be printed directly on a card or card stock, applied as a tape, label, or sticker, or otherwise attached or displayed (e.g., electronically displayed on a tablet, tag, token or LED display as known in the art.) Individual elements of a guide card can be permanently printed or displayed, temporarily printed or displayed, or dynamically updated based on time, status, completion, input, output, feedback, query, or other information before, during, or after a simulation experiment.

The Geographic simulation scheme library is used to store and manage various geographic simulation schemes. These schemes can be provided beforehand by the device and can also be imported by users. Each geographic simulation scheme can consist of two or more parts, for example: 1) the pathway of geographic simulation experiments and 2) the metadata of the geographic simulation scheme. The pathway of geographic simulation experiments can record select tasks including task ID and task purpose. In certain embodiments, six or more geographic simulation tasks can be included in the scheme. For example, these six tasks can include: 1) clarifying the various geographic elements, phenomena, and processes in one or more geographic problems, 2) conducting geographic data normalization, 3) selecting or building geographic models for specific phenomena or processes, 4) simulating the phenomenon or process by using models, 5) conducting the visualization analysis of simulation results, and 6) evaluating the geographic simulation results. The logical dependencies (e.g., serial, parallel, and repeated relations) of the tasks can be also recorded in the pathway. The metadata can record some or all of the (e.g., seven) types of feature tags and their descriptions. Simulation tasks can be repeated or replicated with changes throughout a simulation scheme (e.g., a task based on selecting or building geographic models for specific phenomena or processes can occur more than once and with different inputs and outputs for different types of models such as a weather model and a communications model in the same scheme.)

According to the feature tags, a two-step strategy can be implemented to search and suggest an accurate geographic simulation scheme from the simulation library according to the subject invention. For example, regarding the example of a typhoon disaster warning in Taizhou City, Zhejiang Province, it is needed to use the problem description information provided by users to extract tag-based features. These tags can include, for example, the following features:

The domain feature: typhoon
The purpose feature: prediction
The dimension feature: time dimension and space dimension
The scale feature: urban scale and day scale
The region feature: Zhejiang province
The time feature: summer
The resource feature: historical precipitation data, urban pipe network data During the matching processes according to an embodiment of the subject invention: for the first step, based on a "Logical AND" operation, the simulation schemes associated with domain feature tags and purpose feature tags in the scheme library can be matched and recommended to produce as set of recommended schemes, for example, the simulation schemes associated with a domain tag of "typhoon" and a purpose tag of "prediction"; for the second step, based on a "Logical OR" operation, the remaining tags (e.g., dimension, scale, region, time, and resource) can be used to match schemes from these recommended schemes. The number of matched feature tags decides the recommendation priority of the simulation scheme. If the matched feature tags are higher for one simulation scheme, it can be preferred for the recommendation. Using these recommendations, simulation collaborators can easily select the appropriate geographic simulation scheme.

The provided Geographic simulation task binding subsystem can be used to bind specific task implementation steps to each task that constitutes a geographic simulation scheme. This subsystem can contain a Geographic simulation task pool that advantageously segments and allows for individual updates and improvements in the simulation tasks separate from the simulation schemes. An update or enhancement to one type of simulation task can then be advantageously applied across multiple schemes (e.g., an improved method of modelling physical events such as high wind or rain causing flooding can then be bound to multiple relevant tasks in the next simulation scheme.)

The Geographic simulation task pool can store the information of various geographic simulation tasks, including for each simulation task, for example: 1) the unique identity of simulation task, or task ID, 2) the task purpose, 3) the expected result, 4) the implementation steps, and 5) the resources needed in the simulation task.

In certain embodiments the separate structure between the simulation task pool and the simulation scheme library can help facilitate the reuse of task descriptions and the improvement of task implementation steps. Beneficially, the same task can be easily or efficiently used in many different geographic simulation experiments. For example, a task of terrain analysis can be used in watershed simualtion and also in a forest landscape simulation. Without the separation of structure between the simulation task pool and the simulation scheme library, the same task implementation steps can need to be mentioned in each terrain-analysis-involved simulation experiment repeatedly. In addition, in cases where novel and advanced methods for task implementation are proposed, the corresponding task in the simulation task pool can be easily modified without any need to update the simulation scheme again.

In certain embodiments there can be several differentiators between the simulation scheme library and the simulation task pool. First, the simulation scheme library can provide different schemes for various geographic simulations; the simulation task pool can provide detailed operations to complete certain tasks. Second, the task in a simulation scheme can indicate which tasks are needed for a specific geographic simulation; but the task in the simulation task pool introduces how to perform a specific task. Third, a task in a scheme can contain the task ID and task purpose; apart from these two contents, the task in the task pool can also contain the expected result, the implementation steps, and the resources needed. This segmentation and structure of data provides benefits including efficiency of access and robustness to handle changing requirements.

Figure 4:
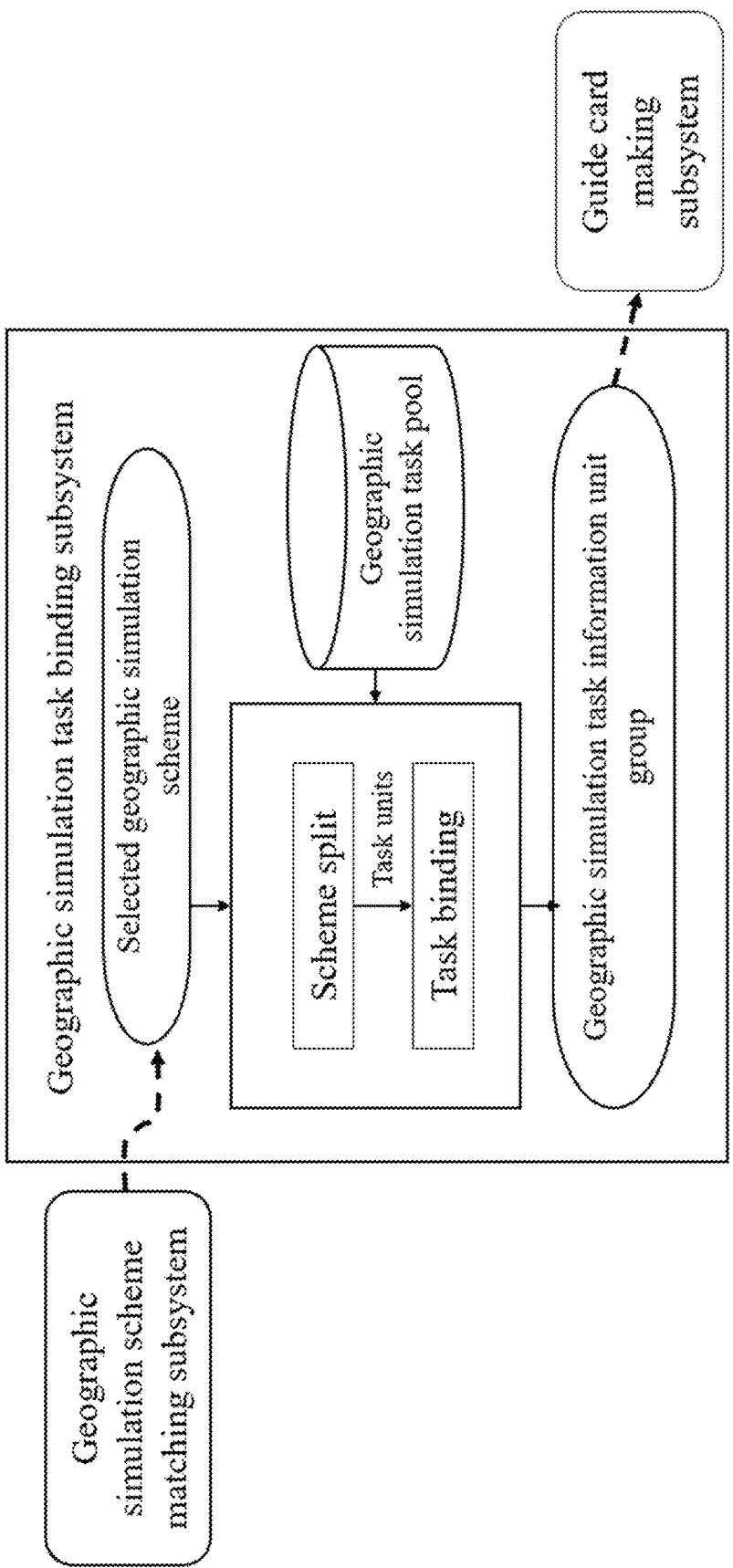
FIG. 4 illustrates elements related to a geographic simulation task binding subsystem in accordance with an embodiment of the subject invention.

After obtaining the simulation scheme from the Geographic simulation scheme matching subsystem, the Geographic simulation task binding subsystem can seek out the corresponding information of task implementation steps from the Geographic simulation task pool. The corresponding information of task implementation steps can be bound to the scheme, according to the various tasks described in the geographic simulation scheme. In the Geographic simulation task binding subsystem, the geographic simulation scheme can be disassembled and divided into a series of task units in which task data (e.g., task ID and task purpose) can be supplied. Meanwhile, the logical dependencies of each task with other tasks (for example, predecessor tasks and successor tasks of a certain simulation task) can be recorded in the task unit. Next, the task information can be found from the Geographic simulation task pool by comparing the task ID, and it can be bound with the task unit and packaged as the task information unit. A whole set of task information units can be obtained by processing a complete geographic simulation scheme. This set of task information units contributes to forming a task information unit group that has all the details of the task as shown in FIG. 4.

Figure 5:
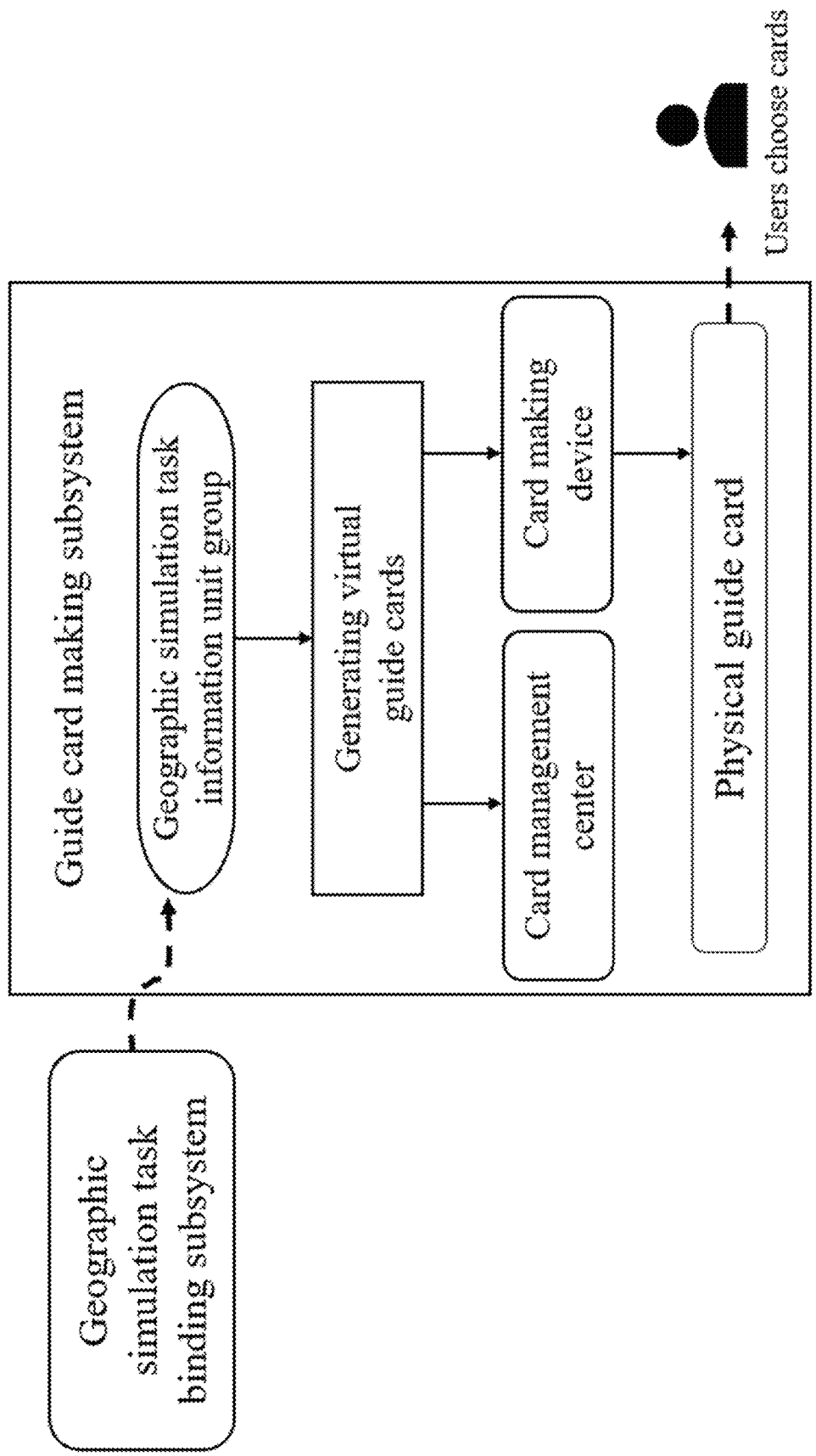
FIG. 5 illustrates elements related to a guide card making subsystem in accordance with an embodiment of the subject invention.

In some embodiments the Guide card making subsystem can create Physical guide cards by using the task information units. These cards can be produced to support teamwork in geographic simulation experiments. The Guide card making subsystem can include a Card management center and a Card making device for this purpose. The design and processing of a Guide card making subsystem of the subject invention are shown in FIG. 5.

In some embodiments the Card management center controls the digital copy of the physical guide card. This digital copy can be called the virtual guide card. It has the same or similar task information to the physical guide card. The Card management center controls all the virtual cards and related functions (e.g., storage, updates, removal, inquiry, etc.) and can also provide these functions to the user on a local terminal or through the web.

Embodiments provide a method by which a user or simulation participant can take, reserve, borrow, check out, or use a guide card (e.g., as a method of controlling or tracking which participant or user is working on which tasks.) When a user takes a physical card, the physical control of that card can by the control mechanism for related tasks. When a user takes a virtual card, the card management center can control access to and awareness of that card by the same or another user.

Embodiments of the Card making subsystem can produce physical guide cards and can print the appearances of the cards and store the task information units into the cards. Alternatively or additionally, the Card making subsystem can produce virtual guide cards and can print the appearances of the cards and store the task information units into the cards physically or with a logical connection. A storage medium associated with a card can be a physical medium such as a printed page, table, or punch list. Alternatively, a storage medium can include a software structure, logical storage, or physical digital device (e.g., a flash card, RFID tag, or USB memory stick) physically or logically connected to the card.

Figure 6:
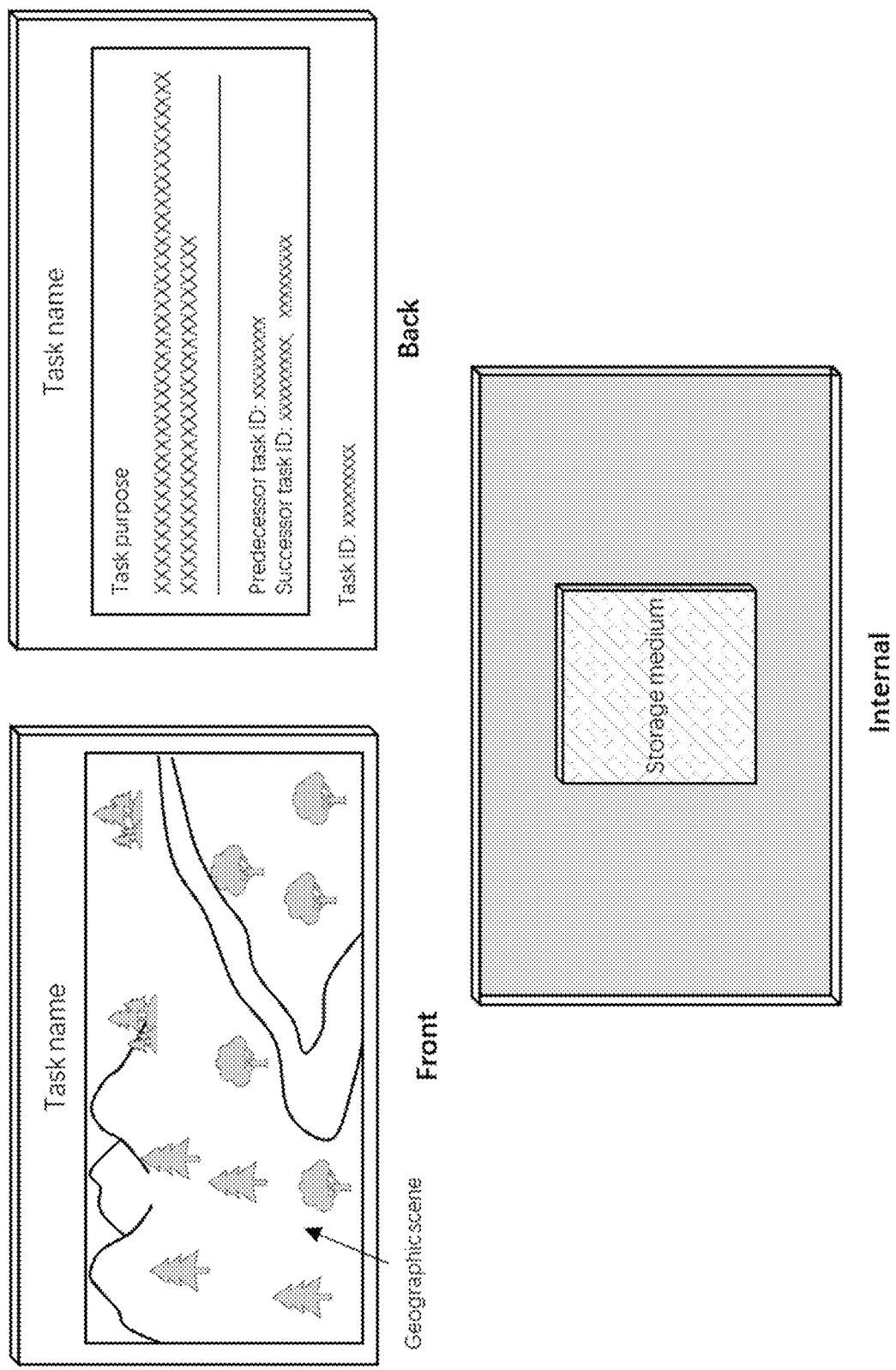
FIG. 6 illustrates a concept design of a physical guide card in accordance with an embodiment of the subject invention.

The Physical guide card can be adapted to coordinate and instruct the participants to carry out geographic simulation experiments. The card's appearance can show various information, including for example: the task name, related geographic scene, task ID, task purpose, and logical dependencies (e.g., the successor and predecessor tasks.) In certain embodiments a storage medium can be embedded in, on, attached to, or removable from the physical guide card to store detailed task information, including the implementation steps of the current simulation task. One example of a concept design of a physical guide card according to embodiments of the subject invention is shown in FIG. 6. Users can query the task information locally or on the web through the task ID or obtain the task details directly from the storage medium in the physical guide card.

In certain embodiments including the provided guide card making subsystems, the task information units can be settled, resolved, or applied to produce virtual guide cards (e.g., an exact, approximate, expanded, or abridged digital copy of the physical guide card.) These virtual cards can be saved in the Card management center, and the card making device from there can generate the physical guide cards. For the task information unit group of the entire geographic simulation experiment, the Guide card making subsystem can generate a set of physical guide cards. Thus, participants can physically or virtually select a task card to join the collaboration of the geographic simulation experiment.

Figure 7:
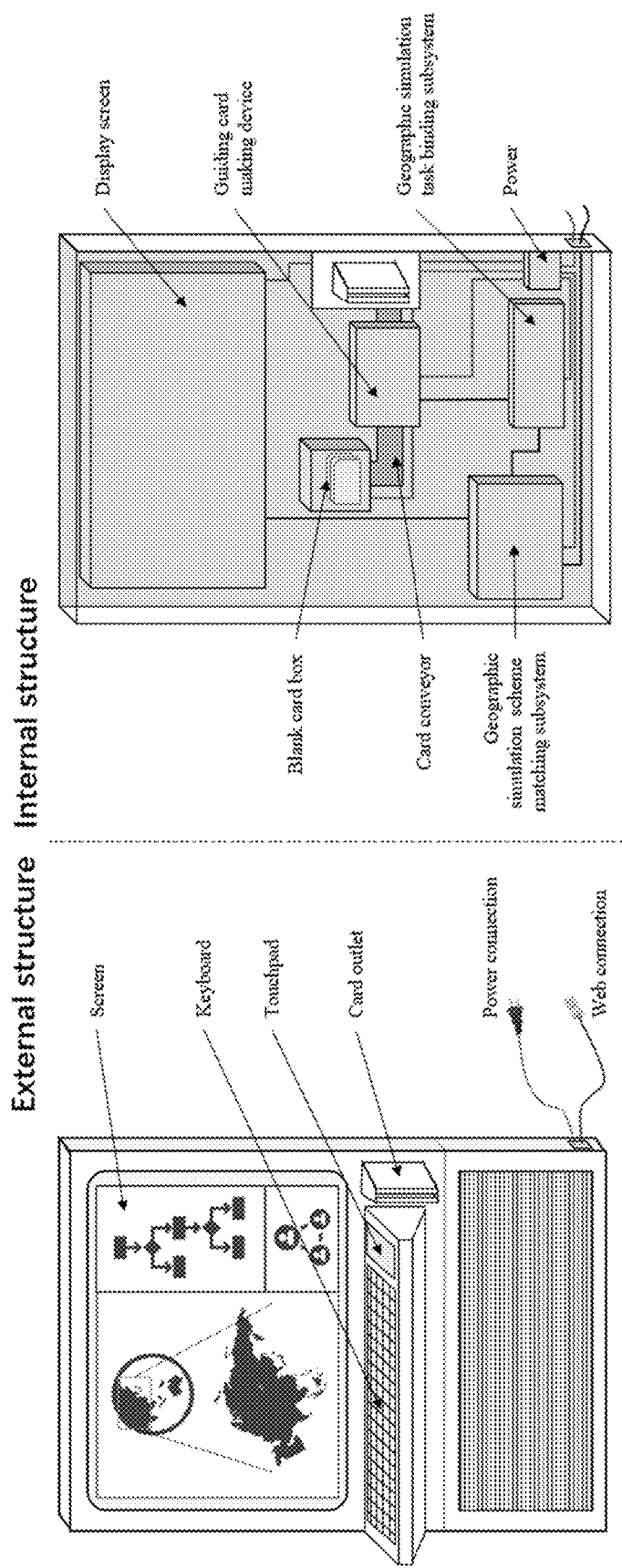
FIG. 7 illustrates a concept diagram of a device in accordance with an embodiment of the subject invention.

A concept diagram illustrating a system and devics in accordance with an embodiment of the subject invention is shown in FIG. 7. Input terminals can include the keyboard, touchpad, radio equipment, and other input devices. Power and network devices can consist of power supply, power connection, web connection, wifi, mobile data connection, and other power or communication connections, and can provide power and a network for the entire equipment. A Guide card making subsystem can make all the cards (e.g., by using a blank card box, card conveyor, and card outlet.) These components support the ability of the subsystem to make guide cards.

Related art in traditional collaborative methods often ignores the expression of the process while supporting the geographic simulation experiments. Compared to traditional methods, the systems and methods provided by embodiments of the subject invention can link different geographic simulation tasks as a complete scheme and recommend a scheme to participants for addressing various geographic problems. Through guide cards, the pathway of geographic simulation experiments and the logical dependencies among simulation tasks can be expressed to promote more orderly collaboration. Even as collaborative geographic simulation environments, tools, and related strategies can provide opportunities for multidisciplinary experts to solve complex geographic problems together, challenges remain in the scenario that participants work outside their familiar domains of experience, training, or expertise. Embodiments of the subject invention provide guide cards that can guide and instruct the participants to undertake a suitable simulation task. In this way, teamwork can be well supported, facilitated, and enhanced in geographic simulation experiments.

Embodiments of the subject invention sort out the required tasks in the process of geographic simulation, e.g.: 1) clarifying the various geographic elements, phenomena, and processes in geographic problems, 2) conducting geographic data normalization, 3) selecting or building geographic models for specific phenomena or processes, 4) simulating the phenomenon or process by using the models, 5) conducting visualization analysis of simulation results, and 6) evaluating the geographic simulation results. Different simulation tasks can join together to construct a geographic simulation scheme. According to the (e.g., seven) types of geographic problem features (e.g., domain, purpose, dimension, scale, region, time, and resource), the geographic simulation scheme can be matched and recommended (e.g., through a method of matching tagged values), and the implementation steps of different simulation tasks can be bound to the geographic simulation scheme. Finally, geographic simulation tasks and task dependencies can be displayed, stored or represented on physical or virtual guide cards to instruct the participants. In certain embodiments, a guideline is provided to the collaborators from different domains to perform simulation experiments outside their domains in an ordered and effective way.

Embodiments of the subject invention can generate different series of guide cards to support the teamwork of collaborative geographic simulation experiments. Collaborators can search, select, or pick up cards according to their expertise and take up geographic simulation tasks under the instruction of the guide cards. Embodiments can be used in conjunction with other collaborative environments, tools, and methods to support geographic problem solving. For collaborative geographic problem solving in the web environment, guide cards according to embodiments of the subject invention can also provide online collaboration guidance for collaborators.

An embodiment can provide a system according the subject invention contained within a single physical cabinet, kiosk, or enclosure. Another embodiment can provide a system according the subject invention contained within a plurality of physical cabinets, kiosks, or enclosures. Other embodiments can provide a system according the subject invention having one or more subsystems, devices, or components distributed across individual physical locations, represented as one or more software modules, or distributed over remote, edge, or cloud computing resources, optionally with other subsystems, devices, or components contained within one or more physical cabinets, kiosks, or enclosures. Input terminals can include keyboard, touchpad, radio equipment, and other input devices known in the art. Power and network devices can include power supply, power connection, web connection, and other power or communications devices known in the art, and can provide power and a network or other local, wide area, or global connectivity for the entire system. The Guide card making subsystem can create one or more cards by using, e.g., a blank card box, card conveyor, and card outlet, or other printing, manufacturing, authoring, or creative elements known in the art. These components can support the ability of the system or subsystem to design, construct, complete, create, populate, direct, or make guide cards.

Turning to the figures, FIG. 1 illustrates an overall framework connecting high level elements in accordance with an embodiment of the subject invention. A Geographic simulation scheme matching subsystem receives user input through the input terminal connector, identifies problem features through a geo-problem recognition device, and recommends a scheme from the geographic simulation scheme library. In some embodiments, the recommended scheme can be passed automatically and in other embodiments the scheme can be reviewed, changed, or edited by a user (e.g., through a user input terminal) before being passed to the geographic simulation task binding subsystem. The geographic simulation task binding subsystem matches tasks associated with the selected or recommended scheme to task information from a geographic simulation task pool and binds tasks to methods before passing task information units to the guide card making subsystem where a card making device produces cards and a card manager can control the cards themselves or direct aspects of their creation and contents. Physical guide cards can be produced for the benefit of simulation participants.

Figure 2:
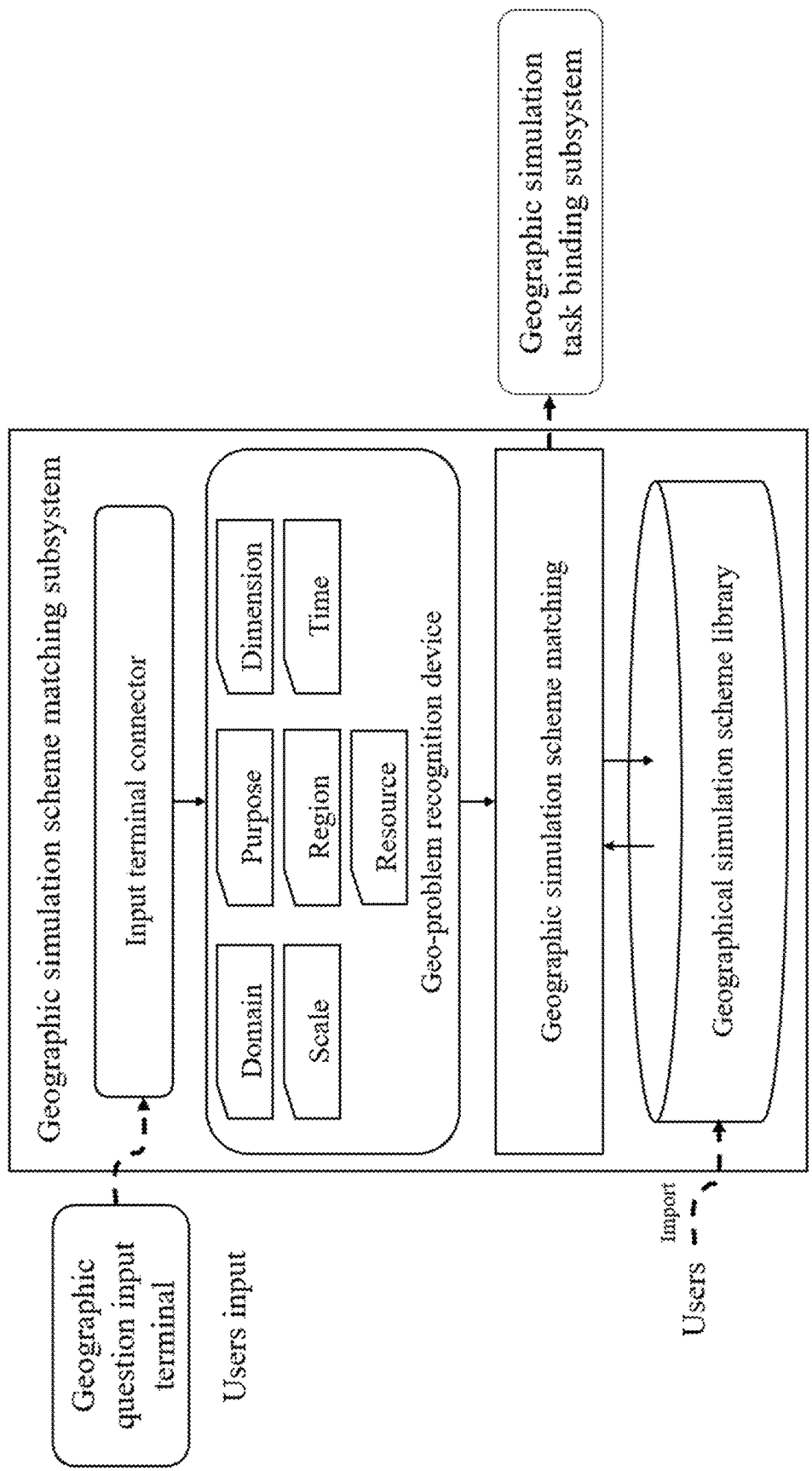
FIG. 2 illustrates elements related to a geographic simulation scheme matching subsystem in accordance with an embodiment of the subject invention.

FIG. 2 illustrates elements related to a geographic simulation scheme matching subsystem in accordance with an embodiment of the subject invention. A geographic question input terminal provides user input (e.g., in the form of natural language text, structured data, tagged data, narrative, imported text, live query, or pre-formatted database) to the input terminal connector. The input terminal connector can be a simple pass-through connection, or it can perform data validation, processing, or manipulation. The geo-problem recognition device is shown in this embodiment with seven features of the geographic problem, including domain, purpose, dimension, scale, region, time, and resource. More or fewer features can be used. The geographic simulation scheme matching device matches the features to schemes from a geographical simulation scheme library. The library my be pre-loaded or pre-determined by the system, or it can be imported by one or more users. The best match scheme can be produced, or a number of schemes can be produced, each with a reported matching or confidence score. Alternatively, users can be allowed to browse, query or modify one or more schemes to suit the needs of a specific simulation. The final selected, recommended, edited, or created scheme is passed to the geographic simulation task binding system.

Figure 3:
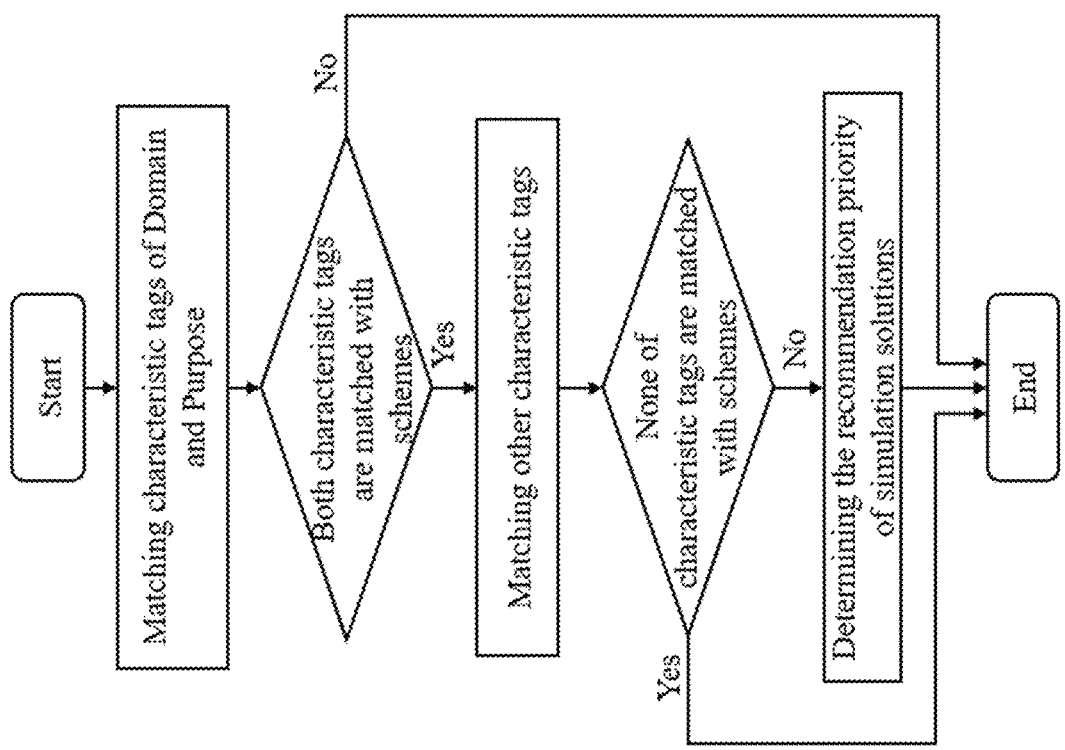
FIG. 3 illustrates a workflow of a two-step matching strategy in accordance with an embodiment of the subject invention.

FIG. 3 illustrates a workflow of a two-step matching strategy in accordance with an embodiment of the subject invention, showing a two-step method of matching schemes to problems, which gives initial priority to tags associated with the features of domain and purpose, then gives priority to matching of other characteristic tags. Schemes that do not match both domain and purpose of the geo-problem for simulation pass directly to the end. Schemes that do not match any of the remaining tags pass directly to the end. Schemes that match on domain and purpose are then evaluated according to their quality of match to the remaining characteristic tags to determine recommendation priority. In some embodiments, this process can be applied to all schemes in a scheme library to determine the recommended or selected scheme.

FIG. 4 illustrates elements related to a geographic simulation task binding subsystem in accordance with an embodiment of the subject invention. A selected geographic simulation scheme is split into task units that are then bound with completion methods from a geographic simulation task pool. Each bound task is then used to create a task information unit, and multiple task information units are collected to form a task information unit group. In some embodiments, the task information unit group can contain every task information unit associated with a selected scheme, alternatively, a task information unit group can contain selected task information units associated with specific portions of a selected scheme, with one or more selected tasks, or with tasks meeting certain criteria (e.g., tasks having logical dependency of successor to a certain task or a specific group of tasks.) A task information unit or a task information unit group can be passed on to the guide card making subsystem.

FIG. 5 illustrates elements related to a guide card making subsystem in accordance with an embodiment of the subject invention. The guide card making subsystem can generate virtual guide cards from some or all task information units of a task information unit group. Virtual guide cards can be managed (e.g., grouped, assigned, prioritized, tracked, marked as pending or complete, reported, or updated) by the card management center. In some embodiments a virtual guide card can be created by the card making device. In other embodiments, a virtual guide card can be passed to the card making device. The card making device can make physical cards from or corresponding to virtual cards, or the card making device can make physical cards from other instructions. Physical cards and virtual cards can contain a task information unit. Users can choose card (physical or virtual) to support their collaborative participation in the geographic simulation experiment.

FIG. 6 illustrates a concept design of a physical guide card in accordance with an embodiment of the subject invention. Physical guide cards can have printed information including labels and values for features or tags, task information, meta data, logical dependencies such as predecessor or successor tasks, and one or more geographic scene images. Physical guide cards can also include a storage medium, which can be internal to the card, for digital or virtual information to be stored with and accessible through the physical card. All features of physical cards can be represented or stored with a corresponding virtual card.

FIG. 7 illustrates a concept diagram of a device in accordance with an embodiment of the subject invention. An external structure can be formed as a kiosk or protective cabinet. User interface elements can include screens, touch screens, keyboards, touchpads, or other user interface devices known in the art. A card outlet can take the form of a simple slot as shown, or more advanced physical media management to sort, organize, track, present, or provide cards to users with automated or passive systems or other media management systems or methods known in the art.

A power connection and web connection are shown and represented as hard-wired in this embodiment, but either can be wired or wireless, internal or external, singular or redundant. For example the web connection can employ wifi or cellular data channels through an internal device or external adapter, network cable, USB, or other connection known in the art. Power can be supplied through a standard wall outlet, internal battery, wireless charging supply, or other power source as known in the art.

An internal structure can take the form of a server rack or custom cabinet to support individual devices or components. Embodiments can also employ one or more servers, processors, or motherboards to support any of the internal systems. For example, a single computer housed within or remote from the internal structure can provide a processor and memory as needed to run a geographic simulation scheme matching subsystem and a geographic simulation task binding subsystem, respectively, as software modules. The internal structure can also include support for a display screen, power and communications subsystems or devices, a card making subsystem that can comprise a blank card box, a card conveyor, and a guiding (or guide) card making device, any of which can be housed within, connected to, or remote from the internal structure or the external structure.

A card box can take the form of a box, a cartridge, a slot, or other means of holding cards or other supplies for producing guide cards, and such cards can comprise paper, polymers, metals, electronics, memory, and user interface devices. Cards can be single use or reusable. In certain embodiments, cards can be provided on electronic devices such as tablet computers, internet-of-things (IOT) enabled devices such as smart-cards, or physical cards comprising paper and printed materials or labels. Cards can be virtual, physical, or both. Card management can likewise be virtual or physical or both. In certain embodiments, one or more physical cards can be advantageously used to control access and organization, to provide a tangible interface point to users, and to better relay specific information; while corresponding virtual cards can be advantageously provided either in place of or in coordination with physical cards to provide dynamic, updated, or expanded information including for example: reference materials, training, standard operating procedures, standards, specifications, results or data from related tasks or cards, and supporting or background information. The relation between physical and virtual cards can be a direct one to one mapping (e.g., exactly one virtual card for each physical card), all virtual cards, all physical cards, multiple virtual cards related to a single physical card, or multiple physical cards related to a single virtual card, all depending on the needs of the simulation experiment being served.

Embodiments of the subject invention address the technical problem of providing an improved data structure, organization, and methods for improving teamwork in collaborative geographic simulation experiments. This problem is addressed by providing an organizational structure that can include a set of (e.g., seven) attributes (e.g., the set of seven features comprising domain, purpose, dimension, scale, region, time, and resource has been found to be advantageously compact and sufficiently comprehensive) to describe the geographic problem; a Geographic simulation scheme matching subsystem that can include a Geographic simulation scheme library (recorded in physical or digital form on non-transitory media); a Geographic simulation task binding subsystem that can include a set of Geographic simulation schemes and a Geographic simulation task pool; and a Guide card making subsystem and Card manager to produce and manage both virtual and physical guide cards that can instruct teamwork in geographic simulation experiments, and that can contain data including task information units in physical (e.g., printed), virtual (e.g., stored digitally to a flash memory or other physical storage device), or combined format (e.g., a physical copy and a digital copy having either the same or different scope, depending on the application.)

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e., the value can be +/−5% of the stated value. For example, "about 1 kg" means from 0.95 kg to 1.05 kg.

The methods and processes described herein can be embodied as code and/or data. The software code and data described herein can be stored on one or more machine-readable media (e.g., computer-readable media), that can include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

Materials and Methods

All patents, patent applications, provisional applications, and publications referred to or cited herein are incorporated by reference in their entirety, including all figures and tables, to the extent they are not inconsistent with the explicit teachings of this specification.

Following are examples that illustrate procedures for practicing the invention. These examples should not be construed as limiting. All percentages are by weight and all solvent mixture proportions are by volume unless otherwise noted.

Example 1 (Prophetic)—Geo-Problem Recognition Device to Extract Features of a Geographic Problem According to Seven Attributes (Domain, Purpose, Dimension, Scale, Region, Time, and Resource)

For the description of a forest harvest in some XX Forest Farm, the users can mention "prediction of harvest volume of Chinese fir plantation after twenty years." This can be taken as the description of purpose. The region can be described as "XX Forest Farm is located in Pingxiang City, Province Jiangxi."

For these descriptions, the device can select these features "prediction", "Volume", "Jiangxi" and "Pinxiang" to instruct the collaborators. The features ("Chinese fir plantation", "prediction", "harvest volume", "Jiangxi" and "Pinxiang") are also selected according to these attributes:
 a) "Chinese fir plantation"—domain feature
 b) "harvest volume" and "prediction"—domain feature
 c) "Jiangxi" and "Pinxiang"—region feature These selected features can be tagged and these tags can be formalized according to the geographic problem, allowing the device to use the tags to match appropriate simulation schemes from the Geographic simulation scheme library.

Example 2 (Prophetic)—Matching Process in a Geographic Simulation Scheme Library According to the feature tags, a two-step strategy can be implemented to search and suggest an accurate geographic simulation scheme from the simulation library according to the subject invention. For example, Regarding the example of a typhoon disaster warning in Taizhou City, Zhejiang Province, it is needed to use the problem description information provided by users to extract tag-based features. These tags can include, in this example, the following features:
 The domain feature: typhoon
 The purpose feature: prediction
 The dimension feature: time dimension and space dimension
 The scale feature: urban scale and day scale
 The region feature: Zhejiang province
 The time feature: summer
 The resource feature: historical precipitation data, urban pipe network data During the matching processes according to an embodiment of the subject invention, a two-step process can be followed to generate a recommendation for a simulation scheme:
 1. For the first step, based on a "Logical AND" operation, the simulation schemes associated with domain feature tags and purpose feature tags in the scheme library can be matched and recommended to produce as set of recommended schemes, in this example, the simulation schemes associated with a domain tag of "typhoon" and a purpose tag of "prediction";
 2. For the second step, based on a "Logical OR" operation, the remaining tags (e.g., dimension, scale, region, time, and resource) can be used to match schemes from these recommended schemes.

Following completion of the above two-step process, the number of matched feature tags can decide or influence the recommendation priority of the simulation scheme. If the matched feature tags are higher for one simulation scheme, it can be preferred for the recommendation. Using these recommendations, simulation collaborators can easily select the appropriate geographic simulation scheme.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

EXEMPLIFIED EMBODIMENTS

The invention can be better understood by reference to certain illustrative examples, including but not limited to the following:

Embodiment 1. A system for producing guide cards (e.g., physical, virtual, digital, or a combination thereof) to enhance teamwork (e.g., by instructing, informing, standardizing, organizing, communicating, explaining, illustrating, or connecting steps, methods, or tasks) in a geographic simulation experiment, the system comprising:
 a user input subsystem configured to provide a user input comprising a set of features related to a geographic problem,
 a scheme matching subsystem configured to select a recommended collaborative simulation scheme for the geographic problem based on the user input, the recommended collaborative simulation scheme comprising a plurality of tasks and a simulation pathway connecting each task of the plurality of tasks;
 a task binding subsystem configured to bind each task of the plurality of tasks to at least one implementation method, and to produce a task information unit group comprising a plurality of task information units, each task information unit comprising task information and logical dependency information related to at least one task of the plurality of tasks; and
 a guide card making subsystem configured to produce a plurality of guide cards based on the task information unit group, each guide card of the plurality of guide cards comprising a task information unit.

Embodiment 2. The system according to Embodiment 1, the set of features in the user input contained within a textual description in the form of a natural language structure and the scheme matching subsystem comprising an input terminal connector configured to extract the set of features from the textual description and change the form of each feature from the natural language structure to a tag-based structure comprising tags selected from the list including domain, purpose, dimension, scale, region, time, and resource.

Embodiment 3. The system according to Embodiment 1, the scheme matching subsystem configured to process the user input in a tag-based structure.

Embodiment 4. The system according to Embodiment 3, the tag-based structure comprising tags selected from the list including domain, purpose, dimension, scale, region, time, and resource.

Embodiment 5. The system according to Embodiment 3, the scheme matching subsystem configured to select the recommended collaborative simulation scheme for the geographic problem based on a comparison of the set of features in the tag-based structure against a simulation scheme library comprising a plurality of simulation schemes.

Embodiment 6. The system according to Embodiment 1, the task binding subsystem configured to access a simulation task pool comprising a plurality of implementation methods for binding to corresponding tasks within the recommended collaborative simulation scheme.

Embodiment 7. The system according to Embodiment 1, the guide card making subsystem configured to produce physical guide cards.

Embodiment 8. The system according to Embodiment 7, the guide card making subsystem configured to produce both physical guide cards and virtual guide cards.

Embodiment 9. The system according to Embodiment 1, each guide card of the plurality of guide cards comprising a graphical representation of a task, printed data related to the task, and digital data related to the task, the digital data on a non-transitory machine-readable medium stored with the guide card, linked to the guide card, or accessible from the guide card.

Embodiment 10. The system according to Embodiment 9, the guide card making subsystem configured to produce a set of physical guide cards representing the task information unit group of the entire geographic simulation experiment.

Embodiment 11. The system according to Embodiment 10, the user input subsystem and the guide card making subsystem both in a common physical location.

Embodiment 12. The system according to Embodiment 9, the guide card making subsystem comprising a first card outlet configured to provide cards at a first physical location, and a second card outlet configured to provide cards at a second physical location.

Embodiment 13. A system for producing guide cards to enhance teamwork, the system comprising:
a processor; and
a machine-readable medium in operable communication with the processor and having instructions stored thereon that, when executed by the processor, perform the following steps:
receiving a user input comprising a set of features related to a geographic problem,
matching a collaborative simulation scheme comprising a plurality of tasks and a simulation pathway connecting the plurality of tasks to the geographic problem based on the user input;
binding a plurality of specific implementation methods to corresponding tasks within the recommended collaborative simulation scheme;
creating a task information unit group comprising a plurality of task information units, each task information unit comprising task information and logical dependency information; and
producing a plurality of virtual guide cards, each virtual guide card of the plurality of virtual guide cards comprising a task information unit selected from the task information unit group.

Embodiment 14. The system according to Embodiment 13, the instructions when executed by the processor further performing the following additional steps:
receiving a simulation scheme library comprising a plurality of collaborative simulation schemes;
accessing or creating a tag-based structure comprising tags selected from the list including domain, purpose, dimension, scale, region, time, and resource;
mapping the simulation scheme library into the tag-based structure to create a tagged simulation scheme library; and
mapping the user input into the tag-based structure to create a tagged user input;

wherein the step of matching the collaborative simulation scheme to the geographic problem comprises a plurality of comparisons between the tagged user input and the tagged simulation scheme library.

Embodiment 15. The system according to Embodiment 14, the instructions when executed by the processor further performing the following additional steps:
instructing a card making device to produce a plurality of physical guide cards, each physical guide card of the plurality of physical guide cards corresponding to exactly one virtual guide card of the plurality of virtual guide cards.

Embodiment 16. The system according to Embodiment 15, wherein the step of instructing a card making device to produce a plurality of physical guide cards comprises instructing a first card making device to produce a first physical guide card in a first location and instructing a second card making device to produce a second physical guide card in a second location.

Embodiment 17. The system according to Embodiment 13, the instructions when executed by the processor further performing the following additional steps:
registering a plurality of simulation participants comprising a first simulation participant and a second simulation participant;
allowing the first simulation participant to access a first task information unit of a first virtual guide card;
allowing the first simulation participant to take the first virtual guide card;
allowing the second simulation participant to access a second task information unit of a second virtual guide card; and
allowing the second simulation participant to take the second virtual guide card.

Embodiment 18. A system for producing guide cards to enhance teamwork in a geographic simulation experiment, the system comprising:
a display screen;
a user input device;
an input terminal connector configured to deliver user input from the user input device to a geo-problem recognition device;
the geo-problem recognition device comprising tags of domain, purpose, dimension, scale, region, time, and resource;
a geographic simulation scheme matching device comprising a geographic simulation scheme library;
a geographic simulation task binding device comprising a geographic simulation task pool;
a card box;
a card conveyor;
a guide card making device; and
a card outlet.

Embodiment 19. The system according to Embodiment 18, the system further comprising:
an external structure configured to support the display screen, user input device, and card outlet, while enclosing the input terminal connector, the geo-problem recognition device, and the geographic simulation scheme matching device.

Embodiment 20. The system according to Embodiment 19, the guide card making device configured to produce a plurality of guide cards adapted to coordinate and instruct a plurality of participants to carry out the geographic simulation experiment, each guide card of the plurality of guide cards configured to show task information and logical dependencies and comprising a storage medium including the implementation steps of a simulation task.

We claim:

1. A system for producing guide cards to enhance teamwork in a geographic simulation experiment, the system comprising:
a user input subsystem configured to provide a user input comprising a set of features related to a geographic problem,
a scheme matching subsystem configured to select a recommended collaborative simulation scheme for the geographic problem based on the user input, the recommended collaborative simulation scheme comprising a plurality of tasks and a simulation pathway connecting each task of the plurality of tasks;
a task binding subsystem configured to bind each task of the plurality of tasks to at least one implementation method, and to produce a task information unit group comprising a plurality of task information units, each task information unit comprising task information and logical dependency information related to at least one task of the plurality of tasks; and
a guide card making subsystem configured to produce a plurality of guide cards based on the task information unit group, each guide card of the plurality of guide cards comprising a task information unit;
wherein the set of features in the user input is contained within a textual description in the form of a natural language structure, and the scheme matching subsystem comprises an input terminal connector configured to extract the set of features from the textual description and change the form of each feature from the natural language structure to a tag-based structure comprising at least one tag selected from domain, purpose, dimension, scale, region, time, and resource.

2. The system according to claim 1, wherein the tag-based structure comprises tags including domain, purpose, dimension, scale, region, time, and resource.

3. The system according to claim 1, wherein the scheme matching subsystem is configured to select the recommended collaborative simulation scheme for the geographic problem based on a comparison of the set of features in the tag-based structure against a simulation scheme library comprising a plurality of simulation schemes.

4. The system according to claim 1, wherein the task binding subsystem is configured to access a simulation task pool comprising a plurality of implementation methods for binding to corresponding tasks within the recommended collaborative simulation scheme.

5. The system according to claim 1, wherein the guide card making subsystem is configured to produce physical guide cards.

6. The system according to claim 5, wherein the guide card making subsystem is configured to produce both physical guide cards and virtual guide cards.

7. The system according to claim 1, wherein each guide card of the plurality of guide cards comprises a graphical representation of a task, printed data related to the task, and digital data related to the task, the digital data being on a non-transitory machine-readable medium stored with the guide card, linked to the guide card, or accessible from the guide card.

8. The system according to claim 7, wherein the guide card making subsystem is configured to produce a set of physical guide cards representing the task information unit group of an entire geographic simulation experiment.

9. The system according to claim 8, the user input subsystem and the guide card making subsystem both in a common physical location.

10. The system according to claim 7, wherein the guide card making subsystem comprises a first card outlet configured to provide cards at a first physical location, and a second card outlet configured to provide cards at a second physical location.

11. A system for producing guide cards to enhance teamwork, the system comprising:
a processor; and
a machine-readable medium in operable communication with the processor and having instructions stored thereon that, when executed by the processor, perform the following steps:
receiving a user input comprising a set of features related to a geographic problem, matching a collaborative simulation scheme comprising a plurality of tasks and a simulation pathway connecting the plurality of tasks to the geographic problem based on the user input;
binding a plurality of specific implementation methods to corresponding tasks within the recommended collaborative simulation scheme;
creating a task information unit group comprising a plurality of task information units, each task information unit comprising task information and logical dependency information; and
producing a plurality of virtual guide cards, each virtual guide card of the plurality of virtual guide cards comprising a task information unit selected from the task information unit group;
wherein the set of features in the user input is contained within a textual description in the form of a natural language structure, and the scheme matching subsystem comprises an input terminal connector configured to extract the set of features from the textual description and change the form of each feature from the natural language structure to a tag-based structure comprising at least one tag selected from domain, purpose, dimension, scale, region, time, and resource.

12. The system according to claim 11, wherein the instructions when executed by the processor further perform the following additional steps:
receiving a simulation scheme library comprising a plurality of collaborative simulation schemes;
accessing or creating a tag-based structure comprising tags selected from domain, purpose, dimension, scale, region, time, and resource;
mapping the simulation scheme library into the tag-based structure to create a tagged simulation scheme library; and
mapping the user input into the tag-based structure to create a tagged user input;
wherein the step of matching the collaborative simulation scheme to the geographic problem comprises a plurality of comparisons between the tagged user input and the tagged simulation scheme library.

13. The system according to claim 12, wherein the instructions when executed by the processor further perform the following additional steps:
instructing a card making device to produce a plurality of physical guide cards, each physical guide card of the plurality of physical guide cards corresponding to exactly one virtual guide card of the plurality of virtual guide cards.

14. The system according to claim 13, wherein the step of instructing a card making device to produce a plurality of physical guide cards comprises instructing a first card making device to produce a first physical guide card in a first location and instructing a second card making device to produce a second physical guide card in a second location.

15. The system according to claim 11, wherein the instructions when executed by the processor further perform the following additional steps:
- registering a plurality of simulation participants comprising a first simulation participant and a second simulation participant;
- allowing the first simulation participant to access a first task information unit of a first virtual guide card;
- allowing the first simulation participant to take the first virtual guide card;
- allowing the second simulation participant to access a second task information unit of a second virtual guide card; and
- allowing the second simulation participant to take the second virtual guide card.

\* \* \* \* \*